United States Patent

Tanizake et al.

[15] 3,637,506

[45] Jan. 25, 1972

[54] FERROELECTRIC CERAMIC COMPOSITION

[72] Inventors: Mikio Tanizake; Yasuo Omori, both of Irumagun; Jun Sugihara, Kawagoe, all of Japan

[73] Assignee: Toko Inc., Tokyo, Japan

[22] Filed: June 25, 1970

[21] Appl. No.: 49,655

[30] Foreign Application Priority Data

June 30, 1970 Japan....................................44/51374

[52] U.S. Cl. ..........................................252/62.9, 106/39 R

[51] Int. Cl....................................C04b 35/46, C04b 35/48

[58] Field of Search...................................752/62.9; 106/39

[56] References Cited

UNITED STATES PATENTS 3,518,199 6/1970 Tsubouchi et al. ...................252/62.9

FOREIGN PATENTS OR APPLICATIONS 814,506 6/1969 Canada................................252/62.9

OTHER PUBLICATIONS

Tanaka et al. " Chemical Abstracts," Vol. 64, P. 11997b (1966)

*Primary Examiner*—Tobias E. Levow
*Assistant Examiner*—J. Cooper
*Attorney*—Flynn & Frishauf

[57] ABSTRACT

The ferroelectric ceramic compositions consist of $PbTiO_3$, $PbZrO_3$ and $Pb(Ni1/5\ Fe1/3\ Nb3/5)O_3$ which are in a hexagonal region defined by points A, B, C, D, E and F in the ternany diagram, the mol percent of these components at these points being

| | $PbTiO_3$ | $PbZrO_3$ | $Pb(Ni1/5Fe1/3Nb3/5)O_3$ |
|---|---|---|---|
| A | 20 | 0 | 80 |
| B | 0 | 30 | 70 |
| C | 0 | 70 | 30 |
| D | 9 | 90 | 1 |
| E | 70 | 29 | 1 |
| F | 60 | 0 | 40 |

1 Claims, 3 Drawing Figures

EQUI-DIELECTRIC CONSTANT LINES
UNIT OF SCALE - Mol %

FERROELECTRIC CERAMIC COMPOSITION

BACKGROUND OF THE INVENTION

This invention relates to novel ferroelectric ceramic compositions or piezoelectric ceramics suitable for use as mechanical ceramic filters, piezoelectric ignition elements, pickups and the like.

Known piezoelectric ceramics have following compositions.

1. A binary system essentially consisting of $PbTiO_3$ and $PbZrO_3$ but modified by a small quantity of another components.
2. A ternary system consisting of above-described two components and substantial quantity of a third component which are formed in the form of a solid solution.

Although these prior piezoelectric ceramics are known to have excellent characteristics, recent trend is to request these piezoelectric ceramics to have a combination of a plurality of different characteristic instead of one. In the prior piezoelectric ceramics, the range of their compositions manifesting the desirable characteristics is relatively narrow. For example, those satisfying high value of Kp are deficient in Qm.

SUMMARY OF THE INVENTION

It is therefore an object of this invention to provide novel piezoelectric ceramics manifesting high values of Kp and other desirable characteristics over wide range.

Another object of this invention is to provide novel ferroelectric ceramic compositions having wide firing temperature range and easy to manufacture.

BRIEF DESCRIPTION OF THE DRAWINGS

The invention can be more fully understood from the following detailed description taken in conjunction with the accompanying drawings in which.

DESCRIPTION OF THE PREFERRED EMBODIMENTS

Figure 1:
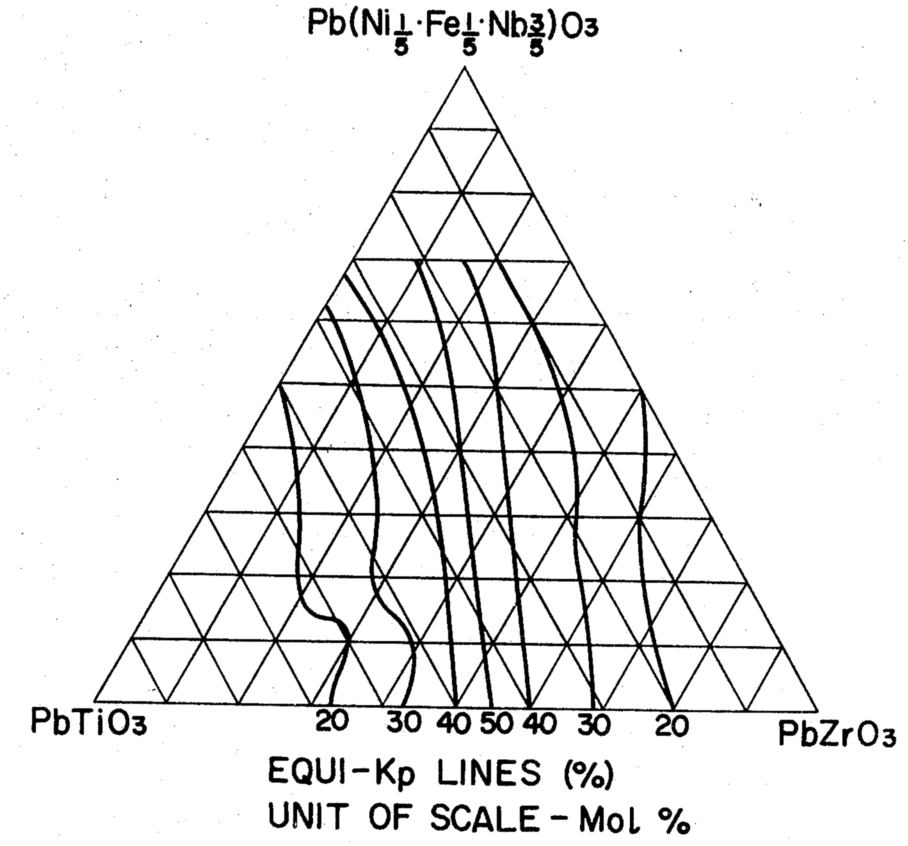
FIG. 1 is a ternary diagram showing equi-Kp lines of the compositions of this invention.
Figure 2:
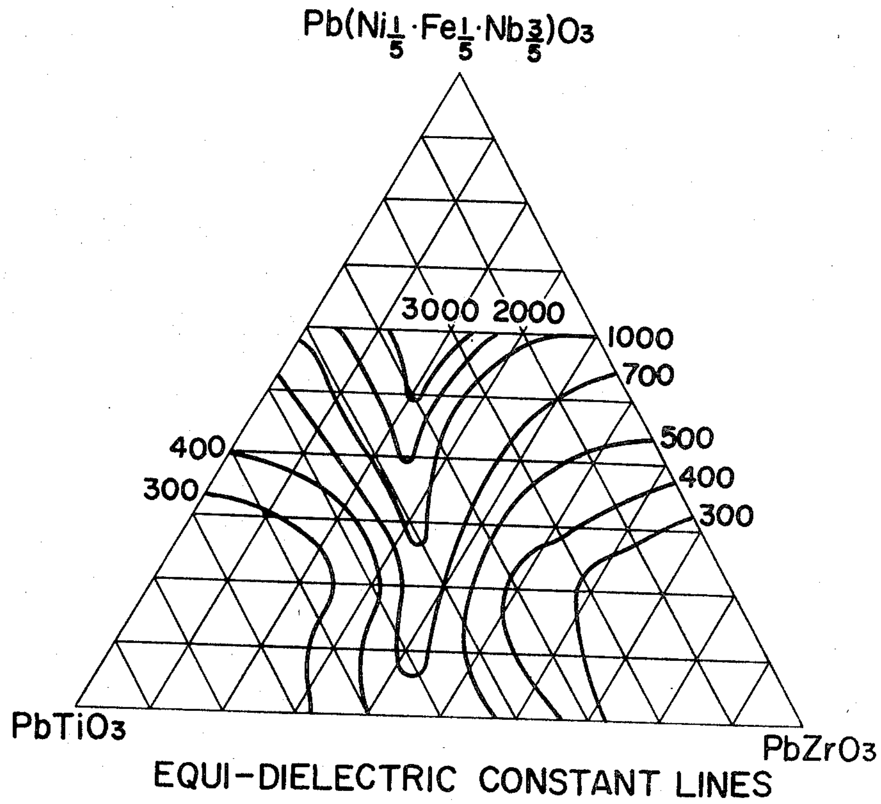
FIG. 2 is a similar diagram showing equidielectric constant lines of the novel compositions and FIG. 3 is a ternary diagram showing the region of the novel ceramic compositions.

The novel piezoelectric ceramics are compositions of a ternary system consisting of $PbTiO_3$, $PbZrO_3$ and Pb(Ni1/5 Fe1/5 Nb3/5)03. As can be noted from a ternary diagram shown in FIG. 1, the region in which the value of Kp is high is much wider than the composition of prior art ternary systems. These compositions are extremely advantageous for the design of piezoelectric elements of various types because said wide region of high Kp also includes points manifesting high values of Qm as well as high values of dielectric constant. Thus this invention provides novel ferroelectric ceramic compositions capable of manifesting a number of desirable characteristics.

Figure 3:
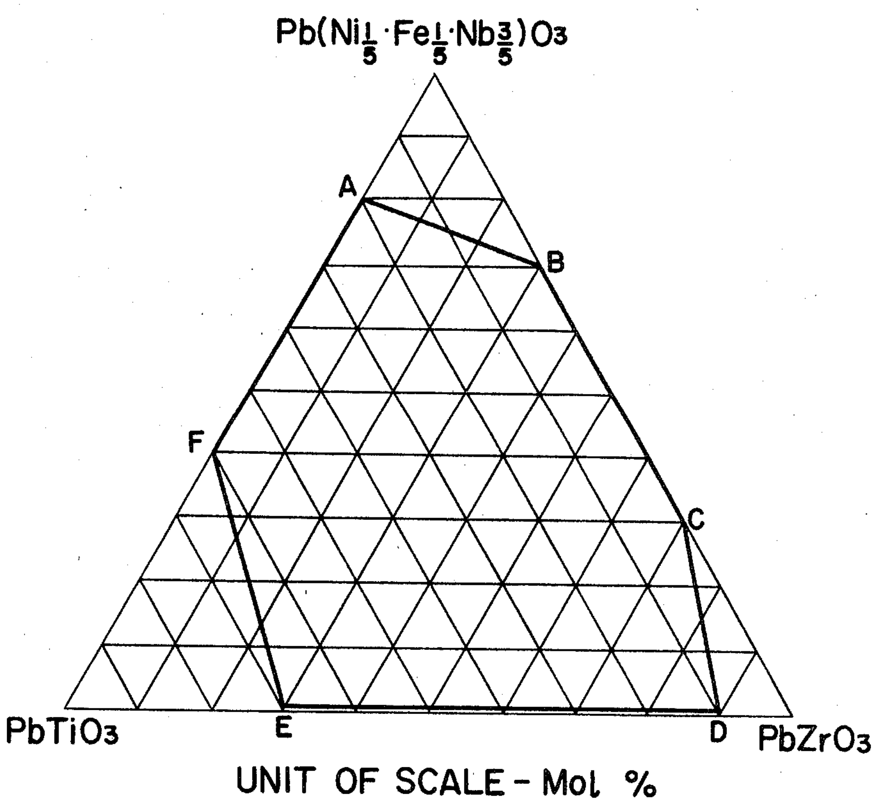

The compositions of this invention are included in a region bounded by points A, B, C, D, E and F in FIG. 3. The compositions at points A, B, C, D, E and F are shown in the following table 1 in which numerals represent mol percent.

TABLE 1

| | $PbTiO_3$ | $PbZrO_3$ | Pb(Ni1/5 Fe1/5 Nb3/5)$O_3$ |
|---|---|---|---|
| A | 20 | 0 | 80 |
| B | 0 | 30 | 70 |
| C | 0 | 70 | 30 |
| D | 9 | 90 | 1 |
| E | 70 | 29 | 1 |
| F | 60 | 0 | 40 |

The reason that the region of the compositions is limited in this manner in this invention is as follows: In regions outside

TABLE 2

| Sample No. | Composition | | | Characteristics* | | | | | | Conditions | |
|---|---|---|---|---|---|---|---|---|---|---|---|
| | $PbTiO_3$ | $PbZrO_3$ | $Pb(Ni_{\frac{1}{5}}Fe_{\frac{1}{5}}Nb_{\frac{3}{5}})O_3$ | ρ | Ro | Kp | fr.D | Qm | ε | Polarization temp., °C. | Firing temp., °C |
| 1 | 70 | 20 | 10 | 7.24 | 196 | 7.0 | 256 | 1,322 | 248 | 20 | 1,250 |
| 2 | 60 | 30 | 10 | 7.46 | 19.2 | 17.6 | 260 | 1,130 | 366 | 140 | 1,240 |
| 3 | 50 | 40 | 10 | 7.37 | 3.5 | 30.3 | 248 | 1,058 | 740 | 140 | 1,250 |
| 4 | 40 | 50 | 10 | 7.57 | 3.9 | 45.2 | 243 | 1,070 | 433 | 140 | 1,240 |
| 5 | 30 | 60 | 10 | 7.56 | 6.3 | 33.6 | 260 | 1,347 | 310 | 140 | 1,240 |
| 6 | 20 | 70 | 10 | 7.46 | 12.7 | 21.7 | 259 | 1,975 | 263 | 140 | 1,240 |
| 7 | 10 | 80 | 10 | 7.15 | 38.1 | 13.7 | 257 | 2,071 | 212 | 140 | 1,240 |
| 8 | 60 | 20 | 20 | 7.28 | 901 | 26.0 | 231 | 23 | 269 | 140 | 1,250 |
| 9 | 50 | 30 | 20 | 7.16 | 702 | 33.3 | 213 | 12 | 366 | 140 | 1,270 |
| 10 | 40 | 40 | 20 | 7.02 | 5.5 | 48.2 | 210 | 347 | 780 | 140 | 1,250 |
| 11 | 30 | 50 | 20 | 6.77 | 19.4 | 31.1 | 233 | 534 | 351 | 140 | 1,250 |
| 12 | 20 | 60 | 20 | 6.91 | 22.4 | 24.4 | 248 | 869 | 292 | 140 | 1,250 |
| 13 | 10 | 70 | 20 | 7.15 | 38.8 | 16.4 | 259 | 1,014 | 288 | 140 | 1,270 |
| 14 | 50 | 20 | 30 | 6.91 | 673 | 25.8 | 220 | 25 | 334 | 140 | 1,250 |
| 15 | 40 | 30 | 30 | 7.09 | 2.6 | 36.5 | 232 | 779 | 1,171 | 140 | 1,260 |
| 16 | 30 | 40 | 30 | 7.28 | 4.0 | 41.1 | 234 | 935 | 543 | 140 | 1,260 |
| 17 | 20 | 50 | 30 | 7.32 | 7.4 | 29.2 | 254 | 1,196 | 415 | 140 | 1,250 |
| 18 | 10 | 60 | 30 | 7.49 | 9.9 | 20.2 | 266 | 2,027 | 369 | 140 | 1,260 |
| 19 | 60 | | 40 | 7.58 | 15.0 | 15.1 | 267 | 1,896 | 401 | 140 | 1,140 |
| 20 | 50 | 10 | 40 | 7.54 | 4.6 | 23.0 | 262 | 2,173 | 567 | 140 | 1,140 |
| 21 | 40 | 20 | 40 | 7.61 | 2.0 | 36.4 | 251 | 1,158 | 1,122 | 140 | 1,180 |
| 22 | 30 | 30 | 40 | 7.56 | 2.4 | 50.2 | 230 | 599 | 896 | 140 | 1,220 |
| 23 | 20 | 40 | 40 | 7.64 | 3.8 | 33.0 | 257 | 1,231 | 566 | 140 | 1,220 |
| 24 | 10 | 50 | 40 | 7.59 | 7.2 | 23.2 | 252 | 1,616 | 485 | 140 | 1,200 |
| 25 | | 60 | 40 | 7.65 | 21.6 | 11.8 | 271 | 1,754 | 480 | 140 | 1,200 |
| 26 | 50 | | 50 | 7.74 | 5.9 | 19.7 | 267 | 2,098 | 607 | 140 | 1,140 |
| 27 | 40 | 10 | 50 | 7.67 | 2.0 | 28.6 | 256 | 1,783 | 1,058 | 140 | 1,140 |
| 28 | 30 | 20 | 50 | 7.58 | 0.6 | 53.8 | 219 | 629 | 3,076 | 140 | 1,220 |
| 29 | 20 | 30 | 50 | 7.55 | 2.3 | 40.8 | 243 | 1,181 | 800 | 140 | 1,220 |
| 30 | 10 | 40 | 50 | 7.55 | 3.1 | 30.8 | 257 | 1,456 | 703 | 140 | 1,280 |
| 31 | | 50 | 50 | 7.52 | 5.1 | 20.5 | 262 | 2,233 | 593 | 60 | 1,280 |
| 32 | 40 | | 60 | 7.64 | 3.1 | 22.2 | 262 | 1,885 | 1,052 | 140 | 1,160 |
| 33 | 30 | 10 | 60 | 7.61 | 0.6 | 43.1 | 236 | 1,064 | 2,625 | 100 | 1,140 |
| 34 | 20 | 20 | 60 | 7.61 | 1.4 | 44.0 | 237 | 905 | 1,283 | 60 | 1,220 |
| 35 | 10 | 30 | 60 | 7.52 | 1.8 | 30.3 | 249 | 1,382 | 1,085 | 60 | 1,280 |
| 36 | | 40 | 60 | 7.49 | 2.7 | 22.1 | 260 | 2,311 | 1,006 | 60 | 1,280 |

*The unit of the compositions is mol percent.

φ: bulk specific weight

*Ro*: resonance resistance (ohms)

*Kp*: radial coupling coefficient (%)

*frb*: frequency constant (kHz.cm.)

*Qm*: mechanical Q

ε: dielectric constant

CD and EF, the value of Kp is low giving piezoelectric ceramics of low commercial value and in regions outside AB the Curie point decreases down to normal temperature.

Considering the composition of the molecular formula $Pb(Ni1/5\ Fe1/5\ Nb3/5)O_3$, this composition may be considered as a composite composition of $Pb(Fe1/2\ Nb1/2)O_3$ and $Pb(Ni1/3\ Nb2/3)\ O_3$. Accordingly compositions represented by this formula may have variable ratio of Fe to Ni, thus Fe; 0 ~ ½
Ni; 0 ~ ⅓ and
Nb; ½ ~ ⅓

If the composition in the parenthesis is selected to be tetravalent, the content of Nb will be determined automatically. Although equimolecular ratio of Fe:Ni is preferred, it should be understood that this invention is not limited to this particular ratio.

EXAMPLE

Oxides of the respective components, namely $PbTiO_3$, $PbZrO_3$ and $Pb(Ni1/5\ Fe1/5\ Nb1/5)O_3$, respectively of the first class reagent purity were weighted as shown in table 2 below. Components of each sample were mixed under wet condition for 15 hours in a ball pot mill lined with rubber to obtain a homogeneous composition. After drying, the composition was calcined for 2 hours at a temperature ranging from 750° to 850° C. The calcined composition was further pulverized under wet condition for 15 hours in the same ball pot mill, and then dried.

One percent of polyvinyl alcohol solution was incorporated to the pulverized composition and the mixture was thoroughly admixed in a mixer. Then the mixture was suitably dried, pulverized and screened to collect powders having a grain size of from 40 to 150 mesh. The powder was then put in a metal mold and molded into a circular disc, 20 mm. diameter (after firing) and 2 mm. thick, under a pressure of 1.5t/cm.[2] by using an oil pressure molding machine. The molded disc was then gradually heated to 700° in an air circulated electric furnace to remove the polyvinyl alcohol incorporated in the previous stage. The disc was placed in an enclosed alumina crucible and fired for 1 hour at a temperature shown in the right-hand most column in table 2. The rate of temperature rise was 300° C./hr. and the disc was maintained at the constant temperature shown in the table for a prescribed period and then the electric furnace was deenergized to cool gradually. The fired product was lapped to a thickness of 0.4 mm. Silver electrodes were applied on nearly the entire surfaces of both sides by the screen printing technique and then fired. The ceramic disc thus obtained was polarized in a silicone oil for 15 minutes by applying a voltage of 3 kv. mm. and at a polarization temperature shown in table 2. The results of measurement of various characteristic after 24 hours are shown in table 2.

These characteristics were determined as follows: *fr*, *fa* and *Ro* were measured by using a IRE standard circuit while dielectric constant was calculated from *Co* which was obtained by a universal bridge at a frequency of 1 kHz. and at 20° C.

*Kp* and *Qm* were determined by following equation of approximation $$Kp=\sqrt{2.51\frac{\Delta f}{fr}}\times 100(\%)$$

where *fr*: resonance frequency
*fa*: deresonance frequency
*Δf*: *fa–fr*

$$Qm\ \frac{1}{4\pi.\Delta f.Ro.Co}$$

where *Ro*: resonance resistance
*Co*: capacitance at 1 kHz.

The bulk specific weight was determined by measuring the weight and dimensions of the disc after lapping but before applying silver electrodes.

Each value of respective characteristics shown in table 2 represents the mean value of 8 to 10 samples.

As can be clearly noted from these data, the piezoelectric ceramics of this invention manifest high *Kp* and another desirable characteristics and the relative values of these characteristics well satisfy practical requirements of high-ability piezoelectric devices. Thus, the novel piezoelectric ceramic compositions are characterized by wide firing temperature, easiness of manufacturing and small difference in the characteristics of the product. In addition, during firing alumina crucible may be inverted and sealed with minute powder of $ZrO_2$. Thus it is not necessary to adjust the vapor pressure of PbO by utilizing lead zirconate. The invention provides ferroelectric compositions manifesting various characteristics described above.

What is claimed is:

1. A ferroelectric ceramic composition consisting of $PbTiO_3$, $PbZrO_3$ and $Pb(Ni1/5\ Fe1/5\ Nb3/5)O_3$, said composition being in a hexagonal region defined by points A, B, C, D, E and F in the ternary diagram of FIG. 3, the mol percent the three components of each of said points being as follows:

| | $PbTiO_3$ | $PbZrO_3$ | $Pb(Ni1/5\ Fe1/5\ Nb3/5)O_3$ |
|---|---|---|---|
| A | 20 | 0 | 80 |
| B | 0 | 30 | 70 |
| C | 0 | 70 | 30 |
| D | 9 | 90 | 1 |
| E | 70 | 29 | 1 |
| F | 60 | 0 | 40 |

* * * * *